(12) United States Patent
Mukherjee et al.

(10) Patent No.: US 9,342,129 B2
(45) Date of Patent: May 17, 2016

(54) COMPUTING ENERGY RATING FOR CLOUD-BASED SOFTWARE SERVICES UTILIZING CONFIGURATION PARAMETERS

(75) Inventors: Tridib Mukherjee, Bangalore (IN);
Gueyoung Jung, Rochester, NY (US);
Koustuv Dasgupta, Bangalore (IN)

(73) Assignee: XEROX CORPORATION, Norwalk, CT (US)

(*) Notice: Subject to any disclaimer, the term of this patent is extended or adjusted under 35 U.S.C. 154(b) by 547 days.

(21) Appl. No.: 13/479,310

(22) Filed: May 24, 2012

(65) Prior Publication Data
US 2013/0318388 A1    Nov. 28, 2013

(51) Int. Cl.
*G06F 9/46* (2006.01)
*G06F 1/32* (2006.01)
*H04W 52/02* (2009.01)
*G06Q 50/06* (2012.01)

(52) U.S. Cl.
CPC .............. *G06F 1/3203* (2013.01); *G06Q 50/06* (2013.01); *H04W 52/0206* (2013.01)

(58) Field of Classification Search
CPC .... G06F 1/3203; G06F 3/0625; G06F 3/3268
See application file for complete search history.

(56) References Cited

U.S. PATENT DOCUMENTS

| | | | |
|---|---|---|---|
| 8,307,362 B1* | 11/2012 | Gong et al. | 718/1 |
| 8,365,175 B2* | 1/2013 | Angaluri | 718/102 |
| 2011/0072378 A1* | 3/2011 | Nurminen et al. | 715/771 |
| 2012/0179446 A1* | 7/2012 | Tylutki | 703/21 |
| 2012/0296585 A1* | 11/2012 | Chen et al. | 702/61 |

* cited by examiner

*Primary Examiner* — Wissam Rashid
(74) *Attorney, Agent, or Firm* — Joseph E. Root

(57) ABSTRACT

A method for computing the energy rating for cloud-based software services is disclosed. For each of the service, following steps are performed. The method includes identifying configuration parameters impacting the energy consumption. The method further includes determining a value for each configuration parameter. Further, the method includes determining a relative energy rating using a pre-determined equation, based on the values of the configuration parameter. Finally, the method includes assigning a discrete value based on the range of the relative energy rating.

9 Claims, 3 Drawing Sheets

COMPUTING ENERGY RATING FOR CLOUD-BASED SOFTWARE SERVICES UTILIZING CONFIGURATION PARAMETERS

TECHNICAL FIELD

Broadly, the presently disclosed embodiments relate to cloud-based services, more particularly, to a method and system for computing the energy rating for cloud-based software services.

BACKGROUND

The concept of Cloud-based services is a virtualization of resources—networks, servers, applications, data storage, and services running on the platform, which provide on-demand access to users. Cloud-based services including, Infrastructure-as-a-Service, Platform-as-a-Service, and Software-as-a-Service, have emerged as principal components of business processes in recent times. While cloud-based services make the use of resources more efficient it places a severe energy burden on the provider. Data centers in the cloud environment consume 1.5-2% of all global electricity, almost half of which is attributed to cooling them; data center energy consumption is growing at a rate of 12% a year. However, energy consumption to run cloud services not only includes energy demand at the underlying infrastructure layer and platform layer but also includes energy requirements pertaining to a service offered at the service layers.

More specifically, the infrastructure-specific energy demand is determined by the energy required to keep computing equipment, such as servers, racks, and network switches active and available to host the services. Each computing equipment has its own power profile. Further, the energy required by cooling units to maintain operating conditions contributes to the infrastructure-specific energy demand.

The platform-specific energy demand is determined by the system software running as a part of middleware and virtualization layer over the underlying infrastructure. Moreover, the infrastructure-specific energy demand and platform-specific energy demand depend on QoS (Quality of Service) parameters including, but not limited to, response time and throughput of the services.

As mentioned above, the service-specific energy demand contributes to the overall cloud energy consumption. Each service running on the platform incurs service-specific energy consumption. The service-specific energy demand depends on the type and duration of resources used by the services. Thus, the cloud hosting all of these services incurs high energy demands and operational costs. Given the high amount of energy consumption, efficiency trends have become imperative and consequently, companies are making efforts to reduce energy consumption.

There exist solutions in the market for energy management in the cloud environment but the existing studies have focused only on the platform and infrastructure layers. Of those, one such solution focuses on energy management at the equipment or infrastructure level—which typically includes allocation of servers in a data center, for example. This also includes platform power management, workload management, network switch management and cooling management. Energy management of cloud-infrastructure is therefore a well-studied area, both in academia and industry e.g., by IBM, HP, and VMware, however, they traditionally focused on energy-efficient provisioning and management of services at the infrastructure layer. Such approaches optimize the computing and cooling resource usage within and across data centers to: (i) reduce energy consumption while meeting performance demands, (ii) improve performance while meeting energy budgets, and (iii) reduce cost through control of energy consumption and performance parameters (e.g. throughput and delay). But these approaches fail to consider the energy metering at the service or software level.

In the past some green operations have focused on a "users-in-loop" approach. For example, SharePrint in the field of document printing services promotes the sharing of printed material among users by providing some kind of incentives for not printing the document. Such conventional users-in loop approaches focus on simple configuration with yes/no options, however, an effective solution requires more comprehensive configuration at the service layer because of multi-dimensional dependencies of configuration parameters on the green operation.

Another approach focuses on providing print job options to users such that paper usage can be optimized.

Existing cloud services offer resources to users without requiring the user to have knowledge of the servers that deliver such services. For instance, when the services are hosted on a cloud, the solutions provide very little or no knowledge to the user of how the choice of one or more services affects the overall energy consumption. The lack of transparency may lead to user dis-satisfaction. Thus, there is a need to provide a user-friendly solution allowing users to select the level of "green" as a trade-off of service quality.

SUMMARY

Embodiment of the disclosure disclose a method for computing the energy rating for cloud-based software services is disclosed. For each of the service, following steps are performed. The method includes identifying configuration parameters impacting the energy consumption. The method further includes determining a value for each configuration parameter. Further, the method includes determining a relative energy rating using a pre-determined equation, based on the values of the configuration parameter. Finally, the method includes assigning a discrete value based on the range of the relative energy rating.

Other embodiments of the disclosure describe a cloud-based system for computing the energy rating for cloud-based software services. The cloud-based system includes a service layer having an energy rating engine performing the following for each service. The energy rating engine identifies configuration parameters impacting the energy consumption. The energy rating engine then determines a value for each configuration parameter. Moreover, the energy rating engine determines a relative energy rating using pre-determined equation based on the values of the configuration parameters. Additionally, the e Additional embodiments disclose an energy rating engine at a service layer for computing energy rating for cloud-based software services. The energy rating engine performs the following for each service. The energy rating engine identifies configuration parameters impacting the energy consumption. The energy rating then determines a value for each configuration parameter. After this, the energy rating engine determines an energy rating using a pre-determined equation, based on the ratios of the configuration parameters. Finally, the energy rating engine assigns a discrete value based on the range of the relative energy rating.

DETAILED DESCRIPTION

The following detailed description is made with reference to the figures. Preferred embodiments are described to illustrate the disclosure, not to limit its scope, which is defined by the claims. Those of ordinary skill in the art will recognize a number of equivalent variations in the description that follows.

Definitions

In various embodiments, definitions of one or more terms that will be used in the document are described below. The term "energy rating" defines the relative energy consumption by a cloud-based service with respect to all other services in a cloud. The term 'green operation' indicates the effect of the carbon footprint on the environment. The energy rating is therefore inversely related to the green operation—the lower the energy consumption, the greener the operation. Quality of Service (QoS) includes various factors, for example, response time and throughput for delivering the cloud services successfully. Service Level Agreement (SLA) is a contract QoS guarantees as required by the cloud customer.

Overview

The present disclosure provides for the user-friendly representation of the usually non-transparent cloud infrastructure layer by abstracting the infrastructure layer at the service layer. More specifically, the disclosure discloses a method and a system for computing energy ratings of cloud-based software services. The energy rating is computed at a service layer. The computation includes identifying various configuration parameters, defining the value of the parameters, calculating Green Point Metrics (GPMs) using pre-defined algorithms, and defining Green Points at the service layer based on these GPMs. The method of the present disclosure provides options for changing the service configuration from the user's perspective. For some embodiments, the energy rating can be used for calculating the cost of the services. While in other embodiments, the energy rating may allow the user to configure services such that the cost can be subsidized with minimal impact on the performance.

Overall Exemplary Cloud Architecture

Energy consumption to run cloud-based services is derived mainly from the underlying infrastructure but there are other components contributing to the energy demand of the overall cloud. As discussed above, those components are platform-specific energy demand, and software-specific energy demand. Unlike the infrastructure-specific demand and the platform-specific demand, the service-specific energy demand, however, is not constrained by Quality of Service (QoS) parameters. Thus, service-specific energy reduction can provide higher flexibility by enabling reduction in performance (i.e., by relaxing the QoS parameters) and hence providing greater opportunity for energy savings. The present disclosure intends to address the gap by focusing on the service layer.

Figure 1:
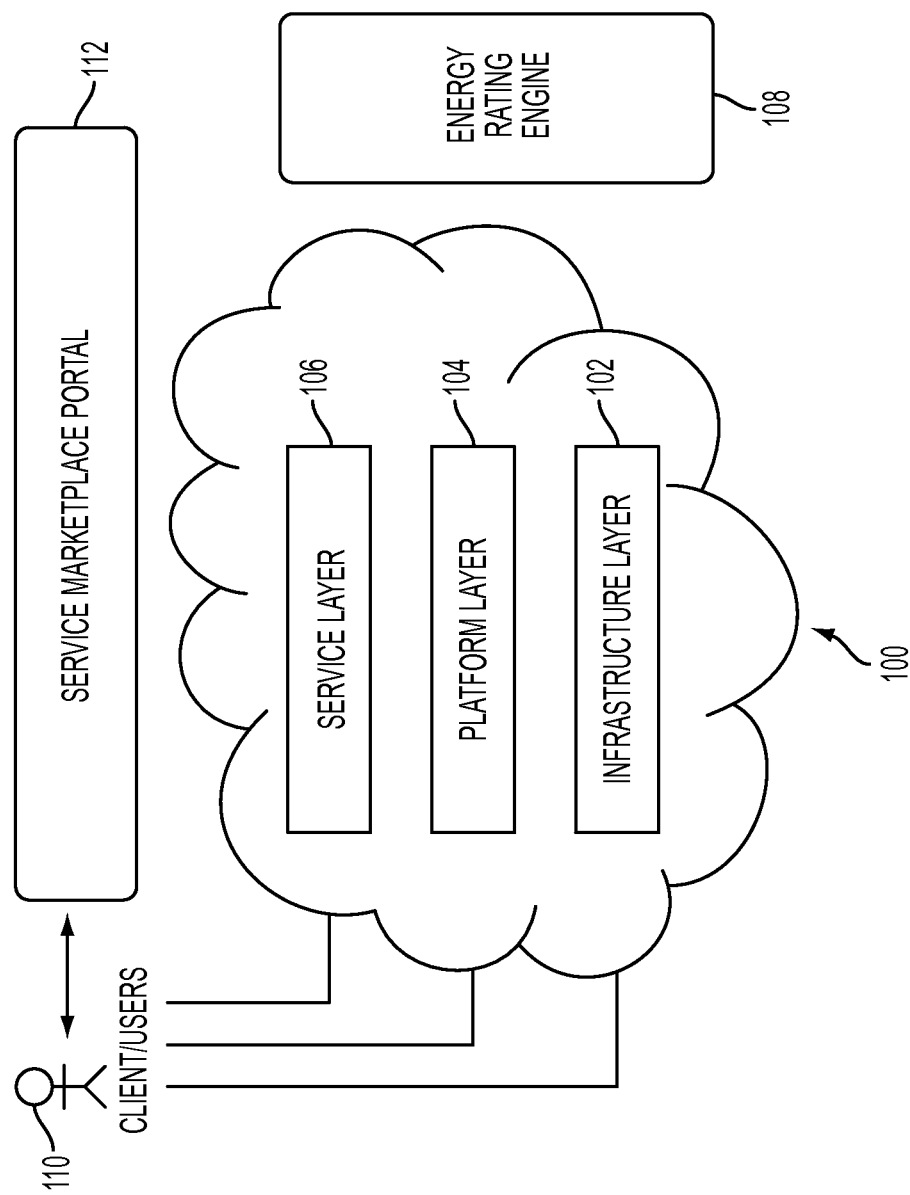
FIG. 1 illustrates an exemplary cloud architecture, according to the disclosure.

FIG. 1 illustrates an exemplary cloud architecture 100. To analyze the present disclosure, the cloud includes an infrastructure layer 102, a platform layer 104, also known as middleware/virtualization layer, a service layer 106, an energy rating engine 108, a user 110, and a service marketplace portal 112. Each of the shown components communicates with the others via conventional network protocols and will be described in detail in the following sections.

The Infrastructure layer 102 includes various kinds of computing equipment such as servers, virtual machines, switches, databases, and the like. This computing equipment is required to support operations and host the services. In some embodiments, service monitoring & management system, and provisioning & management system (not shown) are implemented at the infrastructure layer 102. These systems determine power profiles of the equipment at the underlying infrastructure layer when required. The platform layer 104 offers platforms in terms of operating systems, Windows Azure, for example, which runs over the underlying infrastructure. In some implementations, at the platform layer 104, virtual machines are hosted on the actual machines or servers. Finally, at service layer 106 various services are hosted that are used by the user 110.

The energy rating engine 108 is provided to compute the energy rating for cloud-based software services. To compute the energy rating, the rating engine 108 takes into account service configuration and energy profile of the underlying infrastructure. In one embodiment, the service configuration and energy profile are input by the service monitoring & management system. Once the energy rating is computed, it can be provided to the user 110 through the service marketplace portal 112. Through the portal 112, various service offerings can be provided to the user 110. In other embodiments, the cloud service provider can use the energy rating to maintain the overall energy consumption of the cloud to a certain level or even to subsidize cloud offerings based on energy rating.

Exemplary Flowchart

The Cloud can host various services to meet the business demands. These services can be hosted by the cloud in terms of infrastructure, platform, and software. Energy consumption of cloud services depend on power characteristics and operations of underlying infrastructure including servers, racks, network switches, and cooling units in data centers at the infrastructure layer, and system software at the middleware layer, which may include operating system, resource management algorithms, etc., and which may remain unknown to users. To make the users aware, the disclosure introduces a method for abstracting energy consumption at the service layer 106 based on performance requirements and green objectives.

Figure 2:
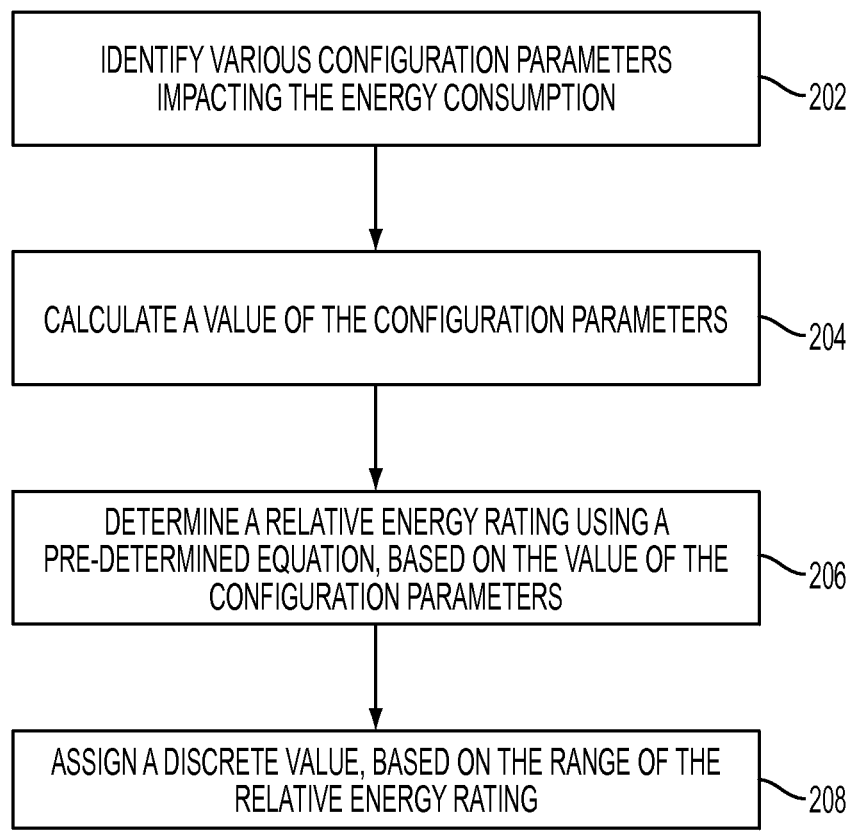
FIG. 2 is a flow chart for computing energy rating for cloud-based software services.

FIG. 2 is a flowchart for computing energy rating of cloud-based software services. The energy rating is computed at the service layer 106 of a cloud-based system and takes into account the power profiles of underlying infrastructure. In particular, the energy rating is computed by the energy rating engine 108 that is integrated at the service layer 106.

The first step toward abstraction of energy consumption at the service layer is to understand and identify the various service configuration parameters that impact the energy consumption. As shown in FIG. 2, step 202 identifies various configuration parameters that impact the energy consumption for the services hosted by a cloud. In one embodiment, the various configuration parameters include computation configuration, communication configuration, and performance demand configuration parameters.

The computation configuration parameters include (a) the types of server requested (i.e. computation demand): the demand for high power servers increases energy consumption, and (b) the number of servers requested (known as resource demand): the larger the number of servers requested, the higher the energy consumption.

The communication configuration parameters include (a) the bandwidth requested (i.e. communication speed demand): high communication bandwidth increases energy consumption, and (b) the input data size (i.e., load on communication): a large amount of input data can increase communication energy consumption.

Finally, the performance demand configuration parameters include time to complete the service (i.e. service duration): Increased execution time, increase the energy consumption. Each of these parameters has different levels of impact on the energy consumption. For example, if a majority in the underlying structure has dual core processor and RAM greater than 2 GB, then two servers will be required for a service, but if the majority of the servers in the underlying infrastructure have quad core processors, and RAM equal to 4 GB, then only a single server is required for that service.

The configuration parameters as defined above may be provided by the user or may be derived from the service requirement. For example, the types and numbers of servers may not be directly provided by the user. Instead, the user may simply enter various storage, computation, and platform requirements, allowing the system to derive the types and number of servers from the service requirement.

Once the configuration parameters are identified, a value, for example, a fractional value is computed, based on the configuration parameters demanded by a service at 204. The fractional value denotes the percentage of a parameter, for example, server demand of specific type by a service with respect to all other services. In the present embodiment, the calculation of the fractional value of the configuration parameters includes calculating the fraction of server power demand for each type, fraction of total servers for each type, fraction of time service is served, fraction of total bandwidth requested, and fraction of total data communicated. The fraction of the total power demand for the requested service is then calculated.

At step 206, the relative energy rating or consumption is determined using a pre-determined equation (discussed below as equation (1)), based on the fractional value of the configuration parameters. The relative energy rating is also known as Green Point Metric (GPM). Finally, at step 208, a discrete value, also referred to herein as the Green Point is assigned, based on the range of the energy rating. The energy rating is the relative energy demand of a service with respect to all other services. The higher is the energy rating, the lower the energy consumption and the greener the operation for the cloud.

Subsequently, the energy rating can be provided to the user 110 in the user understandable format. For example, the energy rating can be used to provide various configuration options to the user 110. In various embodiments, the energy rating can be used to generate energy-optimized workflows such that greener service configurations may be opted for. For example, services critical to the workflow can be configured to have high performance, whereas the other services can be configured with high energy rating. Furthermore, the energy rating can be used for metering the cloud-based services, based on their relative energy demand in a private cloud. For instance, the energy rating may be used for accurate pricing of cloud-based services. Also, the energy rating may be used to offer cloud-based services to users at discounted rates with minimal/no impact on the performance. Moreover, the energy rating allows the user to understand how the choice of various service configurations impacts the energy consumption of the cloud. By utilizing the energy rating in the above manner, a significant amount of energy can be saved.

Exemplary Equations:

Fraction of number of servers demanded by service i: If there are $n_i$ types of CPUs requested by service i, $N^i_{s-j}$ is the number of servers of type j requested by service i, where j varies from $\{1, 2, \ldots n_i\}$, and $N^{total}_{s-j}$ is the total number of CPUs of type j, then $$\frac{N^i_{s-j}}{N^{total}_{s-j}}$$

denotes the percentage of server demand of type j by service i.

Fraction of power demand by server type j: If $P_{s-j}$ is the power consumed by a server of type j, then the percentage of power consumed by a server of type j can be denoted as $$\frac{P_{s-j}}{\sum_{k=1}^{k=n} P_{n-k}},$$

where n is the total types of servers requested by all the services.

Fraction of time service i is served ($t_i$) can be computed based on the total reservation time of service.

Fraction of total bandwidth: If $b_i$ is the bandwidth required by service i and b is the total bandwidth required by all services, then the fraction of bandwidth required by service i is $$\frac{b_i}{b}$$

Fraction of total data: If $d_i$ is the total data input for service i and d is the total data input from all the services, then the fraction of data input for service is $$\frac{d_i}{d}.$$

Relative Energy rating for any service i: (Fraction of total computation energy required by service i+fraction of total communication energy required by service i). The relative energy rating can be denoted by $GPM_i$ (Green Point Metric$_i$) Here, the computation energy is a product of computing power and duration for which computation is performed. The communication energy is a linear function of the product of the bandwidth requirement and the size of data being communicated. Based on this, the above equation can be written as below.

$GPM_i$=(fraction of total power demand for servers required by service i *fraction of time service i is served + fraction of total bandwidth required by service i * fraction of total data communication for service i). This equation is applicable when only a single type of service is requested by all the cloud-based services.

In general, computing power demand is a sum of the power demand of individual servers. If only a single type of server is demanded, then the power demand results in a product of the number of servers and the power consumption of a single server. However, since multiple types of servers can be demanded by a service, an equation to determine computing power demand includes the summing up of the aforementioned product for all types of servers. Accordingly, the equation can be defined as mentioned below:

Relative Energy rating for any service i=(Fraction of total number of servers of server type j requested by service i* fraction of total server power demand by a single server of type j )]*fraction of time service i is served+fraction of total bandwidth requested by service i*fraction of total data communication for service i, $$\text{i.e. } GPM_i = \sum_{j=1}^{j=n_i} \frac{N_{cpu-j}^i}{N_{cpu-j}^{total}} * \frac{p_{cpu-j}}{\sum_{k=1}^{k=n} P_{cpu-k}} * t_i + \frac{b_i}{b} * \frac{d_i}{d} \quad (1)$$

where $n=U_i n_i$ and $GPM_i$ lies between 0 to 1

For some embodiments, it can be considered that $E_{total}$ is the energy demand for the cloud. $E_c$ is the constant energy required to run the infrastructure that includes energy for cooling data centers, and energy for keeping computing equipments available. $E_v$ is the variable energy required to serve the different requirements of the services being hosted. $E_v$ further depends on the energy demands of the services being hosted and thus, is directly proportional to the relative energy rating of the services in the cloud. The energy demand by service i with respect to all other services can be calculated as:

$$E_i = GPM_i * (E_{total} - E_c), \text{ where } E_{total} \text{ and } E_c \text{ are known} \quad (2).$$

Example to Compute Energy Rating

In an example, it can be considered that there are three services hosted over the cloud—service 1, service 2, and service 3. The configuration parameters for service 1 can be 22 servers, 480 GB data, 150 Mbps bandwidth, 110 min execution time. For service 2, the parameters are 6 servers, 80 GB data, 150 Mbps bandwidth, and 120 min execution time. Similarly, for service 3, the configuration requirements include 12 servers, 120 GB data, 150 Mbps bandwidth, and 120 min execution time. Here, the first step is to determine the parametric dependency of these services as a fraction of resource usage of each service over the total resource usage for all services. From the above, it can be calculated that the total number of servers required for all the services is 40, total size of the data is 680 GB, and the total execution time is 350 minutes. The bandwidth requirement for all the services is equal, so the fractional bandwidth usage for all the services is ⅓. Thus, the fractional value of the configuration parameters for service 1 is $^{22}/_{40}$, $^{480}/_{680}$, ⅓, and $^{110}/_{350}$. Similarly, the fractional value of the configuration parameters for the service 2 can be calculated as $^{6}/_{40}$, $^{80}/_{680}$, ⅓, and $^{120}/_{350}$. The fractional value of the configuration parameters for service 3 can be computed as $^{12}/_{40}$, $^{120}/_{680}$, ⅓, and $^{120}/_{350}$. Since there is single type of server in the infrastructure, the fraction of power demand by a server type i.e. $\Sigma_{j=1}^{j=n_i}$ in equation (1) is 1. Based on these factional values, the relative energy rating can be calculated as below:

The relative energy consumption for service 1: $GPM_1 = (^{22}/_{40}) *1*(^{110}/_{350})+(⅓)*(^{480}/_{680})=0.17+0.24=0.41$ Relative energy consumption for service 2 can be computed as: $GPM_2 = (^{6}/_{40})*1*(^{120}/_{350})+(⅓)*(^{80}/_{680})=0.05+0.04=0.09$ Similarly, relative energy consumption range for service 3 is $GPM_3$ $(^{12}/_{40})*1*(^{120}/_{350})+(⅓)*(^{120}/_{680})=0.1+0.06$ Continuing with the above description, it can be further considered that there are five points for energy rating. As GPM indicates the relative energy consumption of service i with respect to all other services, it will be appreciated that the lower the GPM value, the lower the energy consumed and the higher the energy rating. Based on the range of GPM, the discrete points, also referred to as Green Points (GPs) are assigned.

If 0≤GPM<0.2, then the energy rating or GP=5
If 0.2≤GPM<0.4, then the energy rating or GP=4
If 0.4≤GPM<0.6, then the energy rating or GP=3
If 0.6≤GPM<0.8, then the energy rating or GP=2
If 0.8≤GPM<1, then the energy rating or GP=1

Based on the above, the energy rating for service 1 is 3, the energy rating for service 2 is 5, and the energy rating for service 3 is 5. The energy rating of 3 for service 1 indicates more energy consumption than for service 2 and service 3. The greater the energy consumption, the lower the green operation. In cases where the energy rating has a low value, performance parameters can be varied for better green operation. For example, if the execution time is relaxed from 110 min to 120 minutes, only 16 servers are required instead of 22 as mentioned above. Accordingly, the relative energy rating would result in a value of 0.3, and the energy rating or GP increases from 3 to 4.

For a person skilled in the art, it is clear that the embodiments as described above are just illustrative and have been described for the sake of understanding the disclosure and those embodiments do not limit the scope of the disclosure in any way.

Figure 3:
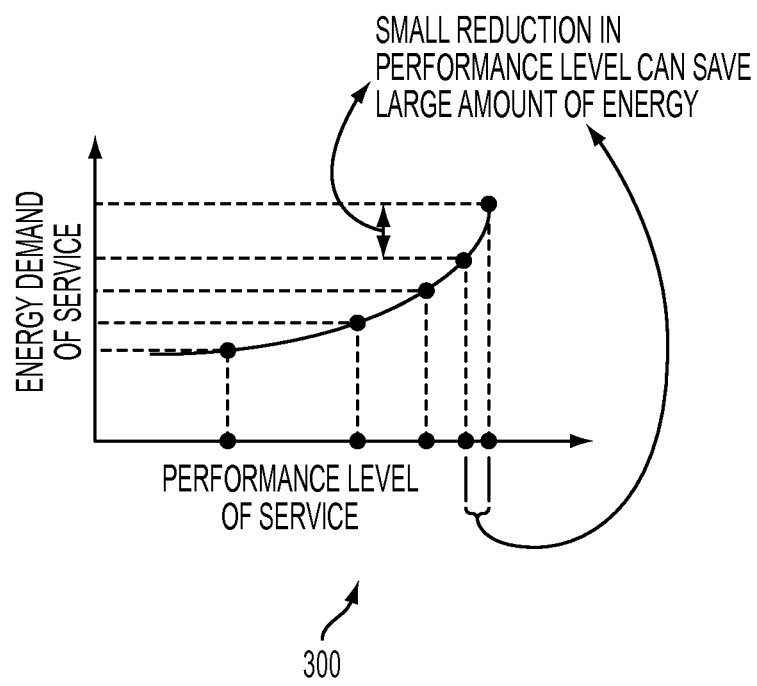
FIG. 3 shows a graphical analysis of energy demand of service versus performance level of the service.

FIG. 3 shows a graph 300 plotted between energy demand of a service versus the performance level of the service. The performance level of the service can be determined from the performance or configuration parameters as discussed above. There is an inherent trade-off between the performance parameters and the energy demand, however, the graph shows that a small reduction in the performance level allows a large amount of energy to be saved and thus, provides sustainable environment and marketplace.

What is claimed is:
1. A method for optimizing total energy consumed by a plurality of computing servers configured to provide different cloud-based software services to multiple users, the method comprising:
   for each cloud-based service delivered to a user, computing an energy rating for the plurality of computing servers, including:
   identifying configuration parameters impacting an energy consumption, the configuration parameter including:
      computation configuration parameters, including at least a number of servers requested by the cloud-based service, a number of different types of servers requested by the cloud-based service and a total power demand of all different types of servers requested by the cloud-based service;
      communication configuration parameters, including at least a bandwidth requested to deliver the cloud-based service and a data input value required to deliver the cloud-based service; and
      performance demand configuration parameters, including at least an execution time required to deliver the cloud-based service;
   determining an actual value for each configuration parameter;
   determining a fractional value for each configuration parameter, the fractional value being a ratio of the actual value for the configuration parameter required to deliver the cloud-based service and a corresponding cumulative value of the configuration parameter required to deliver all different kinds of cloud-based services;

determining a relative energy rating using a pre-determined equation, based on the fractional values of the configuration parameters; and assigning a discrete energy-rating value to the cloud-based service based on a range of relative energy ratings;

optimizing the total energy consumed by the plurality of computing servers, including varying each of the configuration parameters and recalculating relative energy ratings utilizing the varied configuration parameters;

selecting configuration parameters by balancing performance parameters against energy demand, employing the relative energy ratings.

2. The method of claim 1 further comprising, for each configuration parameter, calculating a ratio of the value to a total value from all cloud-based services.

3. The method of claim 1, wherein the energy rating is computed at a service layer of a cloud-based system.

4. The method of claim 1, wherein the energy rating is provided to a user.

5. The method of claim 1, wherein the energy rating is in a user understandable format.

6. The method of claim 1, wherein the configuration parameters are provided by a user.

7. The method of claim 1, wherein the configuration parameters are derived from a provisioning and management system.

8. The method of claim 1, further comprising, allocating each cloud-based service to different virtual machines.

9. The method of claim 1, further comprising, monitoring the configuration parameters.

\* \* \* \* \*